Nov. 20, 1934.  T. ZELLER  1,981,212
BED FOR AUTOMOTIVE VEHICLES
Filed July 12, 1933   2 Sheets-Sheet 1
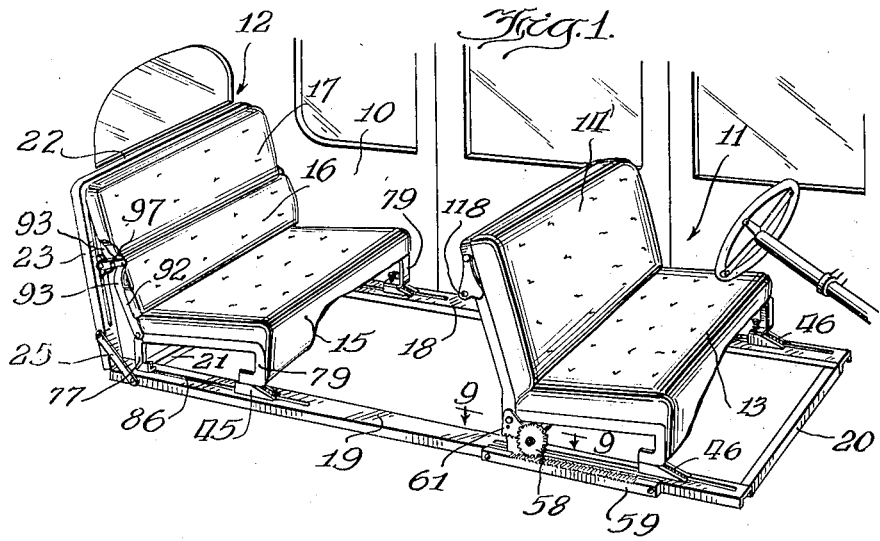
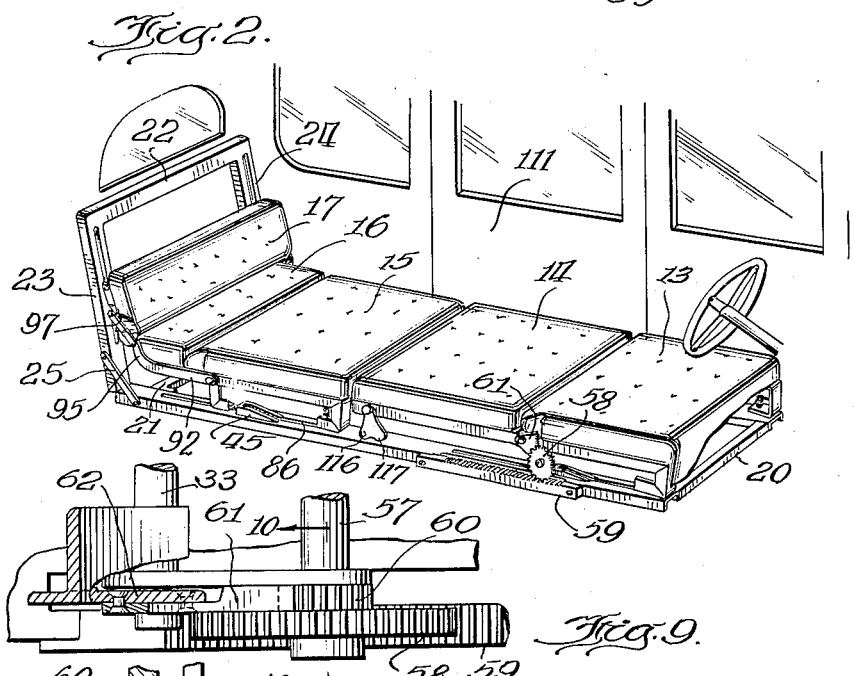
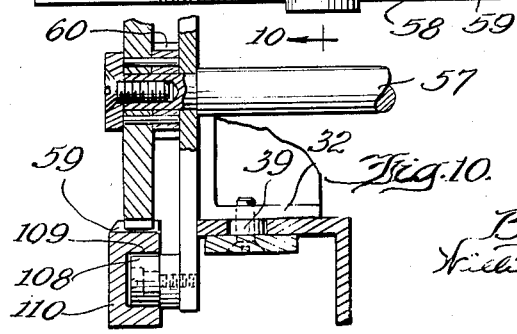
Inventor:
Theodore Zeller
By Williams, Bradbury, McCaul & Hinkle
Attys

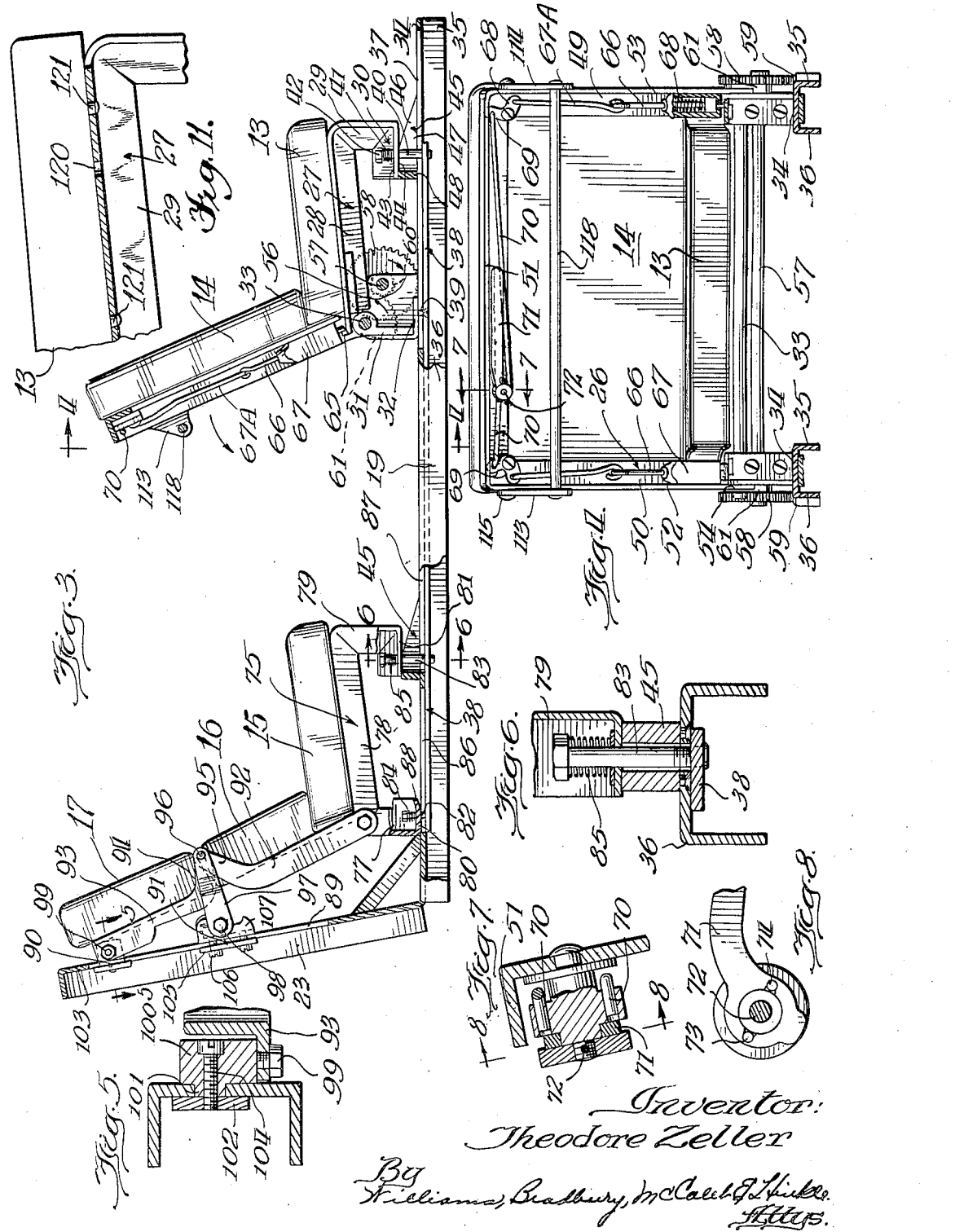

Patented Nov. 20, 1934

1,981,212

UNITED STATES PATENT OFFICE 1,981,212

BED FOR AUTOMOTIVE VEHICLES

Theodore Zeller, Chicago, Ill., assignor of one-half to Albert Kaechele, Chicago, Ill.

Application July 12, 1933, Serial No. 680,005

7 Claims. (Cl. 155—7)

The present invention relates to beds for automotive vehicles, and is particularly concerned with devices of the type in which the cushions for the seats of the automotive vehicle may be utilized to provide a bed inside the vehicle.

Another object of the invention is the provision of an improved automobile bed of the class described, in which all of the cushions may be changed from one position to the other by the moving of one of the parts, the other parts automatically moving into proper relative position.

Another object of the invention is the provision of an improved automotive bed having an improved mechanism for controlling and securing the seats and cushions in predetermined position and for effecting the movement of the seat cushions into proper position without the necessity for separately placing the cushions or otherwise dis-arranging the articles which may be inside the vehicle.

Another object of the invention is the provision of an improved mechanism for an automobile bed in which the cushions may all be of the same depth and in which the cushions may be given sufficient depth to provide relatively long springs, thereby making the seat cushions as soft and resilient as it is desirable to make them in any automotive vehicle.

Another object of the invention is the provision of an improved mechanism in which the seat cushions are not crushed or otherwise deformed by the folding operation, and which is particularly suitable for an automobile sedan, but many of the features of the present invention may be utilized for other types of vehicles, and I do not wish to limit myself to any particular type of vehicle.

Another object of the invention is the provision of an improved bed for automobile vehicles which is sturdy, efficient, economical, anti-rattling, and which is securely held in the seat or bed position so that no accidents may result from the inadvertent change of the positions of the cushions against the will of the user.

Other objects, features and advantages of the invention will be apparent from the following description and from the accompanying drawings, in which similar characters of reference indicate similar parts throughout the several views.

Referring to the drawings, of which there are two sheets:

Fig. 1 is a view in perspective of the interior of an automobile equipped with seats adapted to be arranged to provide a bed according to the present invention, with the parts in the position which they assume when used for seats;

Fig. 2 is a similar view with the parts in the position which they assume when arranged to provide a bed;

Fig. 3 is a side elevational view in partial section, showing the mechanism of the seats and bed in seating position;

Fig. 4 is a rear elevational view of the frame for the front seat, showing the latching mechanism and with parts of the frame in section, taken on the plane of the line 4—4 of Fig. 3;

Fig. 5 is a sectional view taken on the plane of the line 5—5 of Fig. 3, looking in the direction of the arrows, showing the features of construction of one of the sliders for the back seat;

Fig. 6 is a sectional view taken on the plane of the line 6—6 of Fig. 3, looking in the direction of the arrows, showing the details of construction of one of the sliders and cam engaging feet which effect the upward tilting of the front edge of the seats in the position of Fig. 3;

Fig. 7 is a sectional view taken on the plane of the line 7—7 of Fig. 4, looking in the direction of the arrows, showing the details of construction of a lever and connecting rods for actuating the latching mechanism;

Fig. 8 is an elevational view in partial section on the plane of the line 8—8 of Fig. 7, looking in the direction of the arrows, showing the elevational view of the pivotally mounted end of the latch controlling lever;

Fig. 9 is a plan view of the actuating gears, with fragments of the frame in section, the section being taken on the plane of the line 9—9 of Fig. 1, looking in the direction of the arrows;

Fig. 10 is a sectional view taken on the plane of the line 10—10, looking in the direction of the arrows in Fig. 9, showing the details of construction of the driving pinion and gears, which cause the movement of the cushions, and their arrangement in extended relation, end to end.

Fig. 11 is a fragmentary sectional view showing the front seat frame and the cushion with the pins and their sockets for securing the cushion to the seat frame.

The folding automobile bed of the present invention is particularly adapted to be utilized in a sedan and is so illustrated in Figs. 1 and 2, but I desire it to be understood that my invention is capable of general application, and I do not wish to be limited to the use of the invention in automobile vehicles nor in any particular type, but my invention includes the use of the novel features of the mechanism and arrangements shown in any environment.

Referring to Figs. 1 and 2, these are views in perspective, showing the seat cushions in a sedan 10 of conventional type. The sedan usually includes the front seat 11 and the back seat 12, each being formed by a substantially horizontal seat cushion and a substantially vertical but backwardly tilting back cushion.

In the present embodiment, the front seat 11 comprises a seat cushion 13 and a back cushion 14, while the back seat comprises a seat cushion 15 and a pair of back cushions 16, 17 arranged edge to edge to support the back.

While all of these cushions are shown in conventional form, I desire it to be understood that the cushions may be made of any desired thickness and are preferably made of sufficient depth to permit relatively long springs to be used so as to give the cushions the qualities of softness, resiliency and depth which are suitable for any particular type of vehicle. Naturally, the more expensive types of vehicles will have the cushions of greater depth or thickness on account of the larger margin of cost which may be permitted in such case and on account of the provision of more room in the vehicle.

The framework on the vehicle and the seats or bed may consist of a separate framework placed in the vehicle after the chassis has been constructed, or in the case of vehicles which are constructed in the factory with folding bed and seats of this type the framework may be formed by parts of the conventional chassis.

Therefore, the supporting guide rails 18 and 19, in Fig. 1, and the adjoining end frame members 20, 21 and 22 may be considered as parts of a separate framework, or merely parts of the vehicle chassis. Either the vehicle chassis or the frame work is also provided with upwardly extending and backwardly tilting back seat guides 23, 24, which are fixedly secured to the horizontal guides 18 and 19 by angle irons and/or braces 25, or secured in place by being fastened to the body of the vehicle.

The seats of a vehicle are not usually so spaced from each other that the back cushion of the front seat is capable of filling the space between the rear seat cushion and the front seat cushion. I prefer to make the back frame of the front seat of greater height to fill the space between the front seat frame and the rear seat frame, as shown in Fig. 2. The cushions are fitted to the seat and back frames by means of a pin and socket arrangement in which the cushions are provided with pins and the side members of the cushion frames are provided with a series of spaced sockets, whereby the cushions may be lifted and slipped over to other sockets in the frame members to close the gap between the back cushion and the seat cushion.

Furthermore, there is a space in the front compartment of the vehicle in front of the front seat which might then be utilized for the arrangement of cushions to make a bed, inasmuch as it is desirable to make the bed as long as possible to provide a full length bed within the vehicle.

The present mechanism utilizes the space in the front compartment by arranging for movement of the front seat cushion forward so far as possible without interfering with the steering wheel, gear shift levers, or emergency brake.

In order to accomplish this result, both of the seat cushions are movably mounted for sliding upon the guides 18, 19, and in order to bring the back cushion of the front seat into proper position the framework 26 for the back of the front seat is mounted for pivotal movement with respect to the framework 27 for the front seat cushion.

The rest of the upholstery and the cushions carried by the sides of the car are, of course, not secured in any way to the seat cushions or back cushions of the seats, so as to permit the relative movement desired.

The framework 27 for the front seat may consist of a pair of forwardly extending angle irons, channels, or other suitable metal frame members 28, each having a downwardly extending leg 29 provided with a backwardly extending shoe 30.

The frame members 27 are identical on both sides of the front seat, and therefore only one of them need be described in detail. An upwardly extending leg 31 provided with a forwardly extending shoe 32, at the rear of the front seat framework 27, is provided with a transversely extending shaft 33, upon which shaft the frame members 27 are mounted for pivotal movement.

Shaft 33 also extends to the opposite side of the seat frame where a similar leg 31 and frame member 27 are pivotally mounted on the shaft 33.

The guides 18 and 19 may comprise substantially U shaped channels provided with a central web 34 and a pair of downwardly extending flanges 35, 36. The web 34 is provided with a longitudinally extending slot 37, and in order that all of the parts of the mechanism may move together a connecting rod or bar 38 is provided, which is located in each of the U-shaped channels 18, 19, below the slots 37.

The rear shoe 32 of the front seat may be fixedly secured to the connecting bar 38 by screw bolts 39, or any other suitable securing devices. The connecting bar 38 is also preferably provided with a threaded bore for receiving the lower threaded end of a stud bolt 40 which passes through the forward shoe 30. The stud bolt 40 has a helical spring 41, which is compressed between the head 42 of stud bolt 40 and the horizontal flange 43 of the shoe 30. Thus the forward shoe 30 is mounted for sliding movement upward and downward upon the stud bolt 40, and when the seat is in the position of Fig. 3 the forward shoe 30 is supported upon the upper flat surface 44 of a cam 45, which is also provided with an inclined surface 46.

The cam 45 comprises a metallic member, preferably of substantially U-shape, having a pair of forwardly extending flanges 47, each of which has the inclined surfaces 46, and the forwardly extending flanges are joined by the rear yoke 48. One of these cams is fixedly secured to each of the guide members 18, 19.

The framework 26 for the back of the front seat may consist of a pair of upwardly extending metal frame members 49, 50 of angle iron or other suitable section joined together by a transverse metal frame member 51 at the top.

The side flange 52 of the member 50 and the side flange 53 of the member 49 are provided with apertures 54 for receiving the shaft 33, and these apertures are preferably non-circular, fitting a complementary part of the shaft 33, so that the shaft 33 serves to positively join the frame members 49, 50 together at the bottom. Both sides of the seating mechanism are thereby caused to move together, and warping or bending of the back seat frame is positively prevented.

The back frame is pivotally mounted on the legs 31 by means of the shaft 33 with which it moves pivotally.

The rear shoe members 32 and the upwardly extending frame member 31 are secured to metal plates 56 of suitable shape to journal the shaft 33 and also provide a journal mounting for a second shaft 57 which extends from one side of the vehicle to the opposite side. The shaft 57 is provided with a relatively large spur gear 58 at each end, fixedly mounted on the shaft, and the spur gears 58 mesh with the racks 59 carried by each of the guide members 18 and 19.

Shaft 57 also carries at each end a pinion 60 in position to mesh with a gear segment 61, the gear segment being fixedly mounted on shaft 33 and fixedly secured to the extensions 62 of the side frame 49, 50 of the back of the front seat. When the frame of the back of the front seat is pushed downward in the direction of the arrow shown in Fig. 3, the gear segment moves upward in the direction of the arrow applied to the gear segment, causing the pinion 60 to rotate in a clockwise direction, and carrying with it the shaft 57 and spur gear 58.

Spur gear being in mesh with rack 59, the spur gear 58 rolls forward on the rack and carries with it the shoes 32, 30 of the front seat, and the front seat slides forward on the guides 18, 19. When the front seat is in the position of Fig. 3, the frame members 27 tilt upward in a forward direction in such manner as to place the seat cushions 13 at the proper tilt which either convention or best practice indicates is desirable, but when the framework 27 moves forward the shoe 30 slides down the inclined surface 46 of the cam 45 and the seat cushion 13 is leveled.

It will be apparent, therefore, that the tilt of the seat cushion 13 is determined by the height of the cam 45. The legs 29, 31 of the front seat of the framework 27 are, therefore, of the same height, and when the seat cushions are in the position of Fig. 2, the front seat cushion is leveled. The front seat cushion preferably extends backward to a point underneath the back supporting cushion 14 and the arrangement of the cushions is such that when the cushions 13, 14 are moved into horizontal position they may be moved to close the space between the cushions and form a continuous mattress. The width of the back cushion frame of the front seat is substantially equal to the distance between the front seat cushion frame and the back seat cushion and therefore adapted to fill that space.

In order to secure the back of the front seat in the position of Fig. 3, the horizontal frame members 28 may be provided with upwardly extending lugs 65 for the purpose of engaging plunger latches 66, one of which is mounted in a guide 67 on each of the frame members 49, 50. Guides 67 are provided with bores of sufficient size to receive the plunger latch springs 68, which urge the latches 66 downward, into engagement with their keepers, or lugs 65.

The plungers 66 may be connected to connecting rods 67A, which are pivotally connected to one of the arms 68 of the bell crank levers, and the other arms 69 of the bell crank levers are both connected by connecting rods 70 to an actuating lever 71, which is pivotally mounted upon a stud bolt 72.

The connecting rods 70 are eccentrically secured to lever 71 at the points 73, 74, and the levers 70 and 71 form a toggle which by compression against the plungers 66 secures the parts in the position of Fig. 4 as an additional precaution against the unlatching of the plungers 66.

When the lever 71 is moved downward in Fig. 4, the toggle is broken and lever 70 at the left passes over the stud bolt 72 and the lever 70 at the right passes under the stud 72. Thereafter the lever 71 exerts a pull on both of the levers 70, rotating the bell-cranks and withdrawing the plungers 66 from engagement with their keepers.

The back of the front seat may thus be latched in the upright position, but may readily be released by moving the lever 71 in a clockwise direction in Fig. 4.

The front seat frame 26 is also provided with a pair of gravity actuated legs 113, 114, both mounted on the frame members 49, 50 by stud bolts or rivets 115 adjacent the upper end of the frame 26. These legs 113, 114 may consist of metal plates formed as shown in Figs. 1 and 2 with a pair of supporting surfaces 116, 117, which engage the channels 18, 19, or the supporting legs may be of simple triangular form. They are preferably joined by a rod 118 which causes them to move together and which also gives the assembly 113, 114, 118 more weight so that when the back of the front seat moves from the position of Fig. 1 to that of Fig. 2 the legs 113, 114 swing out by gravity from the back frame 26, and are in position to support the upper end of the back frame of the front with its cushion in level position with respect to the other cushions.

When the back of the front seat is elevated these legs swing over beside the frame.

The back seat is provided with a framework 75, which may be similar in construction to that previously described. In this case the framework for the seat cushion 15 consists of a vertically extending metal frame member 77 of angle iron or other suitable section, fixedly secured to a horizontally extending frame member 78, and a front downwardly extending frame member 79.

Frame members 77, 79 are both provided with horizontally extending shoes 80, 81, both of which are provided with bores for slidably receiving the stud bolts 82, 83. Compression springs 84, 85 engage the heads of the stud bolts 82, 83 and cause the shoes 80, 81 to engage the guides 18, 19 resiliently, and the stud bolts extend through slots 86, 87 in the guides. The front shoe 81 slides on a cam 45 similar to that previously described, while the back shoe 80 is capable of slight tilting movement on the toe 88 as the front shoe 81 rides upward on the cam or downward off the cam.

The studs 82, 83 are likewise secured to the connecting bar 38 so that the back seat framework 75 and cushion 15 must move in predetermined relation to the front seat cushion 13 and the back cushion 14 of the front seat.

The back frame members 23, 24 are likewise provided with slots 89 each of which receives a pair of sliders 90, 91. The back frame members of the back seat comprise a pair of links 92, 93. At each side the links 92, 93 are each provided with forwardly extending ends 94, 95 pivotally secured together at 96. This brings the point of pivot of the two back cushions adjacent the outer surface of the cushion so as to prevent the crushing of the cushions.

The pivot 96 is joined by a link 97 to the slider 91, being pivotally mounted thereon by the stud 98. The upper links 93 are pivotally mounted on the slider 90 by the bolts or studs 99. The sliders 90 and 91 may comprise metal blocks 100 (Fig. 5) having ribs 101 for sliding in the slots 89, and having metal plates 102 secured on the other side of web 103 by means of screw bolt 104. In the case of the slider 91 the construction may be similar, but on account of the angle at which the link 92 acts on this slider, the slider 91 is preferably made longer to prevent binding, and its plate 105 is secured by a pair of screw bolts 106 to a block 107.

Referring again to the front seat feet or sliders 30, 32, and particularly to Fig. 10, in order to reduce friction the supporting plates 56 may be extended downward through another slot or at the side of the channelled members 18 and 19 and provided with laterally extending anti-friction rollers 108 which roll in a slot 109 located in the metal member 110 which supports the rack 59.

I desire it to be understood that in any of the sliding parts anti-friction rollers may be utilized, or on any of the pivotally mounted parts ball bearings or roller bearings or other anti-friction devices of the prior art may be utilized to make the devices work with greater facility and to avoid the friction, but in the simpler forms of the devices, such anti-friction bearings or guides may be eliminated.

The various cushions 13 to 17 inclusive may be secured to the various supporting frame members by means of the pins 121 carried by the cushion frames, and fit into complementary sockets 120 in the supporting frameworks, or the cushions may be fixedly secured by bolts, cotter-pins, or any other suitable securing devices.

The operation of my automobile bed is as follows: For normal driving the seat cushions would be used in the position of Fig. 1, in which the seats are suitably displaced from each other and located as desired inside the sedan or other vehicle. When it is desired to use the cushions as a bed, the lever 71, which controls the latching mechanism 66, is moved in a clockwise direction (Fig. 4), that is, downward, and rotated through approximately half a revolution. This pulls the plunger latches 66 upward and permits movement of the back cushion 14 of the front seat downward in the direction of the arrow (Fig. 3). As the back cushion 14 and its framework 26 pivot downward on the shaft 33, the gear segment 56 causes the pinion 60 and gear 58 to rotate in clockwise direction.

The gears 58 roll forward on the racks 59, causing the front seat to slide forward, and the back seat cushion 15 and its framework 75 are likewise drawn forward by means of the connecting bar 38. As both the seat cushions 13 and 15 move forward, their front supporting shoes 43 and 81 are permitted to slide down the cams 45, leveling the cushions 13 and 15 into the position of Fig. 2. Furthermore, the forward sliding movement of the rear seat framework 75 draws downward by means of the links 92, the links 93, and the sliders 90, 91, and the lower cushion 16 of the back seat moves into horizontal position, while the upper cushion 17 remains in substantially vertical position.

The back cushion 14 of the front seat fills the space between the cushion 15 and the cushion 13, and all of the cushions are arranged end to end or side by side, as shown in Fig. 2, to form a continuous bed of full length. The seat cushions may be pulled again into the position to form seats by merely opening the side door 111 and applying a lifting force by means of the hand, which can be inserted under the framework of the back of the front seat. When the back of the front seat is pulled up, the other cushions automatically move into proper position to form the auto seats, and the latch automatically swings into place to hold them in that position.

It will thus be observed that I have invented an improved mechanism by means of which all of the seat cushions may be arranged so as to change the seats of the automobile into a bed, or vice versa, and it is unnecessary to remove articles from the car or for the occupants to get out of the front seat in order to effect this change.

The use of shafts connecting the mechanism at both sides precludes any possibility of the warping or sticking of the mechanism on either side, as both of the sides of the seats are actuated at the same time and driven from twin gears and twin racks. Furthermore, both sides of the seat are preferably latched, and there is no possibility of the seat getting out of order while the user is driving, which might otherwise be the cause of an accident.

The cushions may be made of full depth when my mechanism is employed, and many of the features of the present mechanism may be utilized for vehicles of various different types.

Having thus described my invention, what I claim as new and desire to secure by Letters Patent of the United States, is:

1. In an extensible seat structure, the combination of a pair of horizontal guides with a seat framework comprising a horizontal frame and a substantially upright back frame, said back frame being pivotally mounted with respect to said horizontal frame, and said horizontal frame being slidably mounted on said guides, racks carried by said guides, gears carried by said horizontal frame engaging said racks, pinions for actuating said gears, and a segmental gear carried by said back frame to engage said pinion and rotate said gear on said rack to advance the horizontal frame with respect to said guides when said back frame is pivoted in a predetermined direction.

2. In an extensible seat structure, the combination of a pair of horizontal guides with a seat framework comprising a horizontal frame and a substantially upright back frame, said back frame being pivotally mounted with respect to said horizontal frame, and said horizontal frame being slidably mounted on said guides, racks carried by said guides, gears carried by said horizontal frame engaging said racks, pinions for actuating said gears, and a segmental gear carried by said back frame to engage said pinion and rotate said gear on said rack to advance the horizontal frame with respect to said guides when said back frame is pivoted in a predetermined direction, supporting feet carried by the forward edge of said horizontal seat frame, and a pair of cams carried by said guides whereby said feet are adapted to slide upward on said cams to tilt the horizontal frame when the back frame reaches a substantially upright position.

3. In an automobile folding seat-bed, the combination of a supporting framework, a pair of automobile seats located in spaced relation to each other, each seat comprising a substantially horizontal seat cushion frame and a substantially upright back cushion frame, means slidably mounting said seat cushion frames, means mounting each back cushion frame for downward pivotal movement with respect to its seat cushion frame, and mechanism actuated by the downward pivoting of said back cushion frame of the front seat for moving said front seat cushion frame slidably when said back cushion frame of the front seat is moved pivotally into substantially horizontal position, means connecting said seat cushion frames for sliding movement together and means interconnecting the seat cushion frame and the back cushion frame of the back seat whereby all of said cushions are slid upon said framework when said back cushion frame of the front seat is moved about its pivot, said front seat cushion frame moving forward to utilize the space in front of the front seat and providing horizontal space for the back cushion of the back seat which moves into horizontal position.

4. In an automobile folding seat-bed, the combination of a supporting framework, a pair of automobile seats located in spaced relation to each other, each seat comprising a substantially horizontal seat cushion frame and a substantially upright back cushion frame, means slidably mounting said seat cushion frames, means mounting each back cushion frame for downward pivotal movement with respect to its seat cushion frame, and mechanism actuated by the downward pivoting of said back cushion frame of the front seat for moving said front seat cushion frame slidably when said back cushion frame of the front seat is moved pivotally into substantially horizontal position, means connecting said seat cushion frames for sliding movement together and means interconnecting the seat cushion frame and the back cushion frame of the back seat whereby all of said cushions are slid upon said framework when said back cushion frame of the front seat is moved about its pivot, said front seat cushion frame moving forward to utilize the space in front of the front seat and providing horizontal space for the back cushion of the back seat, which moves into horizontal position, and means for raising the forward edge of the seat cushion frames when the back cushion frames are in substantially upright position, to give the seat cushion frames a backward tilt when used with cushions of substantially the same depth throughout.

5. In a folding automobile bed, the combination of a supporting framework with a pair of automobile seats located in spaced relation to each other, each seat comprising a seat cushion frame and a back cushion frame, the back cushion frame of the front seat being pivotally mounted with respect to the seat cushion frame of the front seat, means for slidably mounting the seat cushion frames of both seats on said framework, and means for connecting said seat cushion frames together to move together longitudinally of the framework, and operative mechanical connections between the pivotally mounted back cushion frame and the seat frame of the front seat and said framework for sliding the seat cushion frames forward when the back cushion frame of the front seat is moved pivotally downward with its cushion surface in alignment with the surface of the seat cushions.

6. In a folding automobile bed, the combination of a supporting framework with a pair of automobile seats located in spaced relation to each other, each seat comprising a seat cushion frame and a back cushion frame, the back cushion frame of the front seat being pivotally mounted with respect to the seat cushion frame of the front seat, means for slidably mounting the seat cushion frames of both seats on said framework, and means for connecting said seat cushion frames together to move together longitudinally of the framework, and operative mechanical connections between the pivotally mounted back cushion frame and the seat frame of the front seat and said framework for sliding the seat cushion frames forward when the back cushion frame of the front seat is moved pivotally downward with its cushion surface in alignment with the surface of the seat cushions, the back cushion frame of the back seat being formed in two pivotally joined sections, means for slidably mounting the upper section of said back cushion frame on said framework, the lower section of said back cushion frame of the back seat being pivotally connected to the seat cushion frame of the back seat whereby said lower section is moved down into horizontal position so that its cushion forms a continuation of the surface of the seat cushion of the back seat.

7. In an automobile folding bed, the combination of a framework provided with longitudinally extending guides, sliders slidably mounted on said guides, substantially horizontal seat cushion frames carried by said sliders on said guides, back cushion frames for each of said horizontal seat cushion frames, the back cushion frames being pivotally mounted with respect to the seat cushion frames, the back cushion frame of the front seat being movable downwardly in a horizontal position to bridge the space between the horizontal seat cushion frames, mechanism including a rack carried by each of said guides and pinions mounted on said front seat frame and engaging said racks for moving said horizontal cushions forward when the back cushion frame of the front seat is moved downward in a horizontal position to form the bed.

THEODORE ZELLER.